United States Patent [19]
Callahan et al.

[11] Patent Number: 5,464,091
[45] Date of Patent: Nov. 7, 1995

[54] PROTECTIVE COVERS

[75] Inventors: Steven E. Callahan, Sutton; Robert G. Petit, Phillipston, both of Mass.

[73] Assignee: Microplas, Inc., Clinton, Mass.

[21] Appl. No.: 141,075

[22] Filed: Oct. 26, 1993

Related U.S. Application Data

[63] Continuation-in-part of Ser. No. 833,140, Feb. 10, 1992, and a continuation-in-part of Ser. No. 55,724, Apr. 30, 1993.

[51] Int. Cl.$^6$ .............................. B65D 85/30; B65D 85/57
[52] U.S. Cl. ........................ 206/45.15; 206/308.3; 206/485
[58] Field of Search ............................ 206/444, 485, 206/1.5, 425, 45.15

[56] References Cited

U.S. PATENT DOCUMENTS

| | | |
|---|---|---|
| 4,684,019 | 8/1987 | Egly . |
| 4,838,422 | 6/1989 | Gregerson . |
| 4,867,311 | 9/1989 | Metcalf ................................. 206/444 |
| 4,884,691 | 12/1989 | Behrens et al. . |
| 4,940,142 | 7/1990 | Behrens et al. ........................ 206/444 |
| 5,027,950 | 7/1991 | Gutierrez et al. . |
| 5,072,835 | 12/1991 | Price, Jr. et al. . |
| 5,154,290 | 10/1992 | Chieng . |
| 5,201,414 | 4/1993 | Kaszubinski ........................ 206/444 X |

*Primary Examiner*—Jacob K. Ackun
*Attorney, Agent, or Firm*—James Creighton Wray

[57] ABSTRACT

Method and apparatus for protecting and storing media, such as magnetic storage discs. A protective cover is formed by a front side, a back side and a mechanism for engaging a storage container. The front side can be connected to the back side by a base that promotes the separation of the sides and their closure towards one another, or includes a recess conforming to the object to be protected, with at least one side having a detent for promoting the retention of the object, such as a rectangular jacket with a movable shutter for a magnetic storage disc. The recess can include a shutter lock. The protective cover is insertable into a storage tray which retains the protective cover by, for example, hingeable extensions of the tray which are folded against sides of the tray when the cover is to be inserted, and the cover is retained unless it is moved to a substantially vertical position which permits withdrawal.

2 Claims, 9 Drawing Sheets

PROTECTIVE COVERS

This is a continuation-in-part of Ser. No. 07/833,140 filed Feb. 10, 1992 and Ser. No. 08/055,724 filed Apr. 30, 1993. The invention relates to protective covers, and more particularly to protective covers for magnetic media.

BACKGROUND OF THE INVENTION

Among the most common forms of magnetic media in use today are diskettes, which are typically included in a plastic jacket with one or more access openings to allow a magnetic head to make contact with a rotatable disc within the jacket.

Unfortunately, the ordinary jacket and the contained magnetic media are fragile and easily damaged. For example, dust and debris, or even a finger print, can damage the magnetic media. In addition, when the diskettes are stored, they tend to be tightly packed within a storage tray or container. As a result, it is difficult to see the label area which lists the diskette information.

Accordingly, it is an object of the invention to facilitate the protection of materials. A related object is to protect magnetic media. Another related object is to protect magnetic media in the form of diskettes.

Another object of the invention is to facilitate the storage of materials. A related object is to facilitate the storage of magnetic media. Another related object is to facilitate the storage of magnetic media in the form of diskettes.

Still another object of the invention is simplify the protection of materials. A related object is to simplify the protection of magnetic media. Another related object is to simplify the protection of magnetic media in the form of diskettes.

A further object of the invention is to economize on the protection of materials. A related object is to economize on the protection of magnetic media. Another related object is to economize on protection of magnetic media in the form of diskettes.

With respect to the foregoing objects, consideration has been given to the prior art, with emphasis on the lockability of protective covers, as disclosed in U.S. Patent Office Class 206, subclasses 45.15 and 444; and Class 312, subclasses 10 and 12.

The following patents have been noted, which are listed in order of issuance beginning with the earliest:

| U.S. Pat. No. | TITLE | INVENTOR AND/OR ASSIGNEE |
| --- | --- | --- |
| U.S. Pat. No. 4,838,422 | DATA STORAGE CONTAINER | Barry Gregerson/ Empak, Inc. |
| U.S. Pat. No. 5,027,950 | DISPLAY AND HOLDER ASSEMBLY | Gutierrez, Jeffries and Marino/ unassigned |
| U.S. Pat. No. 5,072,835 | TAPE CARTRIDGE HOLDER | Price, Ball and Johnson/ Engineered Data Prod. |

U.S. Pat. No. 4,838,422 ('422) "Data Storage Container", assigned to Empak, Inc. of Chanhassen, Minn. discloses an open-ended data storage container (10) for a disk cartridge (110). Two engaging members (12 & 14) form an enclosure (FIG. 6) with a spring-like retainer (16) for containment or ejection of the cartridge. Mating top rails (54 & 56) and bottom rails (28 & 30), all with tapered edges, allow for the engaged stacking of like containers horizontally or vertically.

The '422 patent emphasizes a flexible retainer (16)], including an ejector spring (92); a lip (74 or 76) fixedly coupled to each of two rails (58 or 60) whereby a channel is formed; a second portion adapted to be frictionally engaged within the channel and a tab (96) for releasably retaining the first portion (12) in fixed relation to the second portion (14). In addition, two different molds are required to produce the data storage container and the ejector spring needs to be pressed to remove the disk cartridge. Accordingly, this patent does not satisfy the objects of the invention.

U.S. Pat. No. 5,027,950 ('950) "Display and Holder Assembly" discloses a support and display assembly (10) for floppy disks or diskettes. A support frame (12) has rotatably mounted holders (28) that allow pivoting between oppositely disposed and angularly oriented positions. Each of the holders, and each contained diskette, is in a spaced-apart, parallel relation to one another when in either of two opposite positions. A braking structure (40) is provided to restrict the pivotal movement of the holders so that such holder will not "automatically" travel between opposite positions by the forced displacement of one holder.

The '950 patent emphasizes the use of a brake including an elongated strip disposed in frictional engagement. Accordingly this patent does not satisfy the objects of the invention.

U.S. Pat. No. 5,072,835 ('835) "Tape Cartridge Holder" is assigned to Engineered Data Products, Inc. of Boulder, Colo. and discloses a compartment forming member for supporting a tape cartridge (C) on an elongated shelf (22) supporting a compartment forming member (30) with a base having a width slightly greater than the width of the shelf. The compartment is mounted on the shelf by flanges (40 & 42) in a resilient contacting relationship.

The '835 patent emphasizes a device with at least one compartment forming member having a base width greater than a support surface; means for mounting the compartment forming member on an elongated shelf; and an integral support depending from the base and located between a pair of flanges to support the compartment forming member on the elongated shelf with at least a portion of the base portion spaced from the support surface with the flange portions and flanges in a juxtaposed relationship. In addition the compartment forming member has a base portion width greater than the width of the support surface; a mounting for the compartment forming member on the elongated shelf"; an integral support depending from the base portion and located between the pair of flanges for contacting the support surface to support the compartment forming member on the elongated shelf with the flange portions and the flanges in a juxtaposed relationship; the integral support being formed by at least a pair of spaced apart support members, with each support member having an end portion in contact with the support surface. This patent does not satisfy the objects of the invention.

A patent of interest is U.S. Pat. No. 5,154,290 ('290), Issued Oct. 13, 1992, For: "Cassette Jacket for a 3.5 Diskette", Inventor: Walter Chieng, Appln. No. 729,039, Filed Jul. 12, 1991. This patent discloses a compact disk jacket in which leaf springs for engaging an inserted diskette are connected between front and rear plates on respective opposite sides. The spring sheets are separate elements from the front and rear plates. Because the leaf springs in the '290 patent are exposed outside their side walls, they are fragile and easily broken in use, especially during the insertion and removal of a diskette. In addition the diskette jacket is molded in a fashion that causes part warpage, so that it is difficult to insert the diskette into the jacket because of the reduction in the entry space of the jacket. This warpage adds undue pressure if the front and rear portions of the jacket are separated to allow entry of the diskette following which the warpage produces unsatisfactory pressure against the inserted diskette. This pressure on the printed shutter area of a diskette causes the printing to become scraped and scratched. Another objection is that the jacket has an extended frontal portion that conceals identifying indicia on the diskette.

Another patent of interest is U.S. Pat. No. 4,884,691 ('691) issued Dec. 5, 1989 for "Device for Storing a Data Diskette in a File Folder". This patent discloses a holder for retaining and storing individual diskettes by a receptacle that secures each diskette using a tongue-shaped pressure element that presses against one side of the diskette. Holding catches in the base of the holder face the pressure element to engage into complimentary recesses in the diskette. A binder on the side edge of the holder includes apertures for inserting the holder in a file folder. Due to the construction of the holding catches, the user must use two hands to remove the diskette from the holder. Also, the pressure element obscures identifying indicia on the diskette. Moreover, the apertured binder on the side edge interferes with use of the holder when removed from a file folder. It also requires inconvenient file folder storage which interferes with ready-access to a desired holder, in much the same fashion that inserts in an ordinary file folder have a tendency to stick together and hinder rapid access to a particular insert.

Accordingly, it is a further object of the invention to realize a diskette storage system which avoids and overcomes the limitations of the known prior art.

A related object is to avoid the need for apertured binders for the storage of diskettes, as well as the need for an obscuring pressure element to secure a diskette within a holder.

SUMMARY OF THE INVENTION

In accomplishing the foregoing and related objects, the invention provides a protective cover with a front side, a back side and means for engaging a storage container. The front side can be connected to the back side by a fixed member that conforms to the object to be protected, and one side includes means for promoting the retention of the object. The front side can be connected to the back side by a frame or by a hinge, which can be a living hinge that promotes the separation of the sides, when separated, and promotes the closure of the sides when closed towards one another.

In accordance with one aspect of the invention one side includes a recess conforming to the object to be protected and one side includes means for promoting the retention of the object. When the object is a rectangular jacket for a magnetic storage disc, the recess conforms to the jacket and the retention promoting means is at least one lug for engaging the jacket.

When the object is a rectangular jacket with a movable shutter for a magnetic storage disc, the recess can include a shutter lock, with the recess conforming to the jacket and the retention promoting means comprising at least one lug for engaging the shutter. In addition, the front side can include a groove for receiving a projection from the back side in order to permit the interlock of like protective covers.

In accordance with a further aspect of the invention one of the sides includes, on opposite edges, means for engaging a storage container. The engagement desirably is by bosses that project outwardly from the edges of the protective cover. The bosses can be positioned between the walls of the housing.

In accordance with still another aspect of the invention one of the covers includes an extension opposite the base for limiting the flex of the associated cover. One of the covers includes a protrusion at an upper edge.

In accordance with a still further aspect of the invention, provision is made for a storage tray into which the protective cover is insertable. The storage tray includes side walls separated by the width of the protective cover, and the side walls include means for retaining the protective cover therein. The storage tray includes a base from which the side walls extend, and the side walls include interlocks, desirably extending at angles with respect to the base, for retaining the protective cover therein. In addition, the interlocks may be proportioned to provide a snap fit. The slots can be included in hingeable extensions of the sides of the cover and the extensions are folded against the sides when the cover is to be inserted. The storage tray can include side walls separated by the width of a container for the protective cover. As a result the protective cover may be stored in the storage tray within a container until the protective cover is to be used. Tile storage tray can include a base from which side walls extend, and slots are provided for retaining the protective cover unless the cover is moved to a substantially vertical position which permits the cover to be withdrawn from the slots.

In a method of protecting an object in accordance with the invention, the steps include providing a protective cover having a backside separated from a front side; inserting an object to be protected against one of the sides; and engaging a flexible detent from within in one of the sides for temporary retention of the object. Other steps can include separating a front side of a protective cover from a back side, inserting an object to be protected against one of the sides and closing the sides towards one another with the object therebetween.

When the object is a magnetic disc within a jacket having a movable shutter, it can be inserted between side walls of the cover, against one of the sides, and the shutter held in closed position by a projection within the cover that engages the jacket. In general, the object inserted between side walls, and against one of the sides, can be held thereagainst by a projection from the side that engages the jacket. The protective cover containing the object is temporarily inserted into a storage tray.

In a method of manufacturing a protective cover in accordance with the invention for an object, the steps include providing a protective cover with front and back sides that are separated from one another by a distance suitable for engaging the object within the protective cover, and including outwardly extending projections positioned between the sides, and providing a storage tray with slots for receiving the projections of the protective cover with respect to side walls of the storage tray. The protective cover desirably is molded of polypropylene or polystyrene.

In accordance with further features of the invention, the protective cover is proportioned to provide ready access to graphic materials accompanying diskettes for user identification. In addition, the protective covers of the prior art generally obscure the graphics identifying the diskette density, making identification difficult and thus hindering the efficient use of data processing system in which several different diskettes are employed, requiring proper identification of the diskette before it can be suitable used in the system. It is important for the user to identify the diskette type without removing the diskette from its protective cover. Some diskettes are designed for high density (HD) storage of information and others are not, so the user needs to know on which machine the diskette can be used before removing it from its protective cover. In effect, the protective cover of the invention provides a low profile frame for the storage of diskettes, as opposed to a completely enclosed receptacle with its objectionable obscuration of graphics and attendant difficulties in the insertion and removal of diskettes.

Another feature of the invention is that the diskettes can be inserted bidirectionally, thus economizing on user time in the return of used diskettes to their appropriate protective covers.

A further feature of the invention is that a diskette can be removed from its protective cover while positioned in a storage tray without touching the protective cover. This facility permits the user to grasp the upper portion of the stored diskette and remove it by an upward pulling motion from the storage tray without contacting the protective cover, in order to simplify the removal and reentry procedures. In addition, the diskette held by a protective cover in accordance with the invention is retained securely enough that it does not fall from the cover when inverted; yet the holding action is sufficiently great that there is no hindrance on the removal of a diskette while enclosed in a protective cover.

Still another feature of the invention is that the protective covers of the invention do not contact each other when they are fanned, i.e., stroked by the hand of the user across the tops of the diskettes in a manual search operation to identify the diskette of interest. This allows the user to rapidly identify the appropriate diskette and is made possible by the design of the inner side wall of a storage tray in accordance with the invention. This design includes specially proportioned arrow-headed recesses in the side walls to limit fanning travel during flip action by a user in seeking a particular diskette of interest. Each arrow-head includes end stops to limit the travel of inserted covers during a fanning operation. Nevertheless, the invention allows dense storage of protective covers which can be retained in a storage tray, but also are easily removable to be carried portably.

Moreover, clips are provided for connecting various storage trays together in different directions.

The side walls of the storage trays are connected by living hinges to panels which can be initially aligned with the base of a storage tray in order to accommodate a prepackaged set of diskettes, and then interlocked with the side walls to receive individual diskettes when removed from the packaging. This facility allows the storage trays of the invention and the prepackaged diskettes to be offered as a unit and thus reduce the packaging. In addition, the use of a living hinge simplifies the manufacture of the storage tray and avoids the need for a mold with collapsing cores or side actions, allowing the product of the invention to be produced with a simpler mold.

A further feature of the invention is that a strengthened stiffening rib is used with the storage tray to keep their side walls straight and strong. In addition, the manufacturing technique for producing the products of the invention makes use of relatively thin side walls to reduce material content and manufacturing cost. This technique is achieved by injection gate locations at the apexes of the individual protective covers and at the base of the storage trays.

With respect to the manufacture of the protective covers, they include a minimal projected area to entrance cost effectiveness of the molding operation. This provides a low profile front which protects the stutter area of an inserted diskette without fully covering it in order to avoid interference with graphics on the shutter which could be damaged by scraping if the front of the cover had a higher profile.

Another manufacturing feature of the invention is the use of vertically positioned stop cores which allow the production of engagement spring fingers in protective covers which are under pressure while a diskette is being retained. This permits the production of a flexible engagement finger which is relatively small and yet is strengthened by a reinforcement rib to produce an "I" beam like structure with a sufficient moment of inertia to withstand even applications of force during insertion and removal of a diskette, but are not under pressure while the diskette is engaged.

Still another manufacturing feature is the inclusion of flat-surface ribs on storage trays to compensate for draft needed to facilitate removal of parts during molding and yet provide parallel surfaces to assure proper alignment of interconnected storage trays in accordance with the invention.

With respect to the insert slots associated with the side walls of the storage trays, entry ramps are included to provide for snap-in action in relation to the insertion and removal of stored diskettes contained within protective covers. In addition, positioning members are included in the slots of the flexible walls to prevent overtravel and undertravel during fanning action and to assure a 90 degree position for removal of a particular protective cover from the storage tray.

DESCRIPTION OF THE DRAWINGS

Other aspects of the invention will become apparent after considering several illustrative embodiments of the invention, taken in conjunction with the drawings in which:

FIGS. 8A through 8D-2 illustrate the interlock of storage trays in accordance with the invention.

DETAILED DESCRIPTION

With reference to the drawings, a protective cover 10 in accordance with the invention is shown in FIGS. 1A through 1E. The protective cover 10 has a front side 11, a back side 12 and a base 13 that connects the back side 12 to the front side 11. The base 13 is used to provide a permanent closure, or promote the separation of the sides 11 and 12.

Figure 1A:
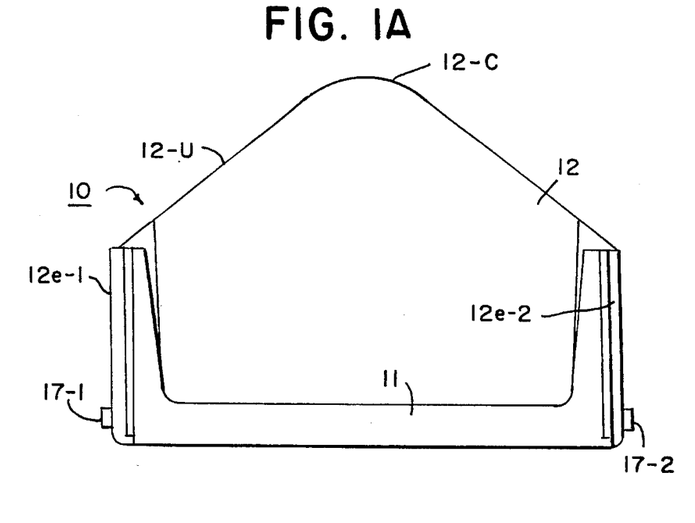
FIG. 1A is a front view of a protective cover in accordance with the invention.
Figure 1B:
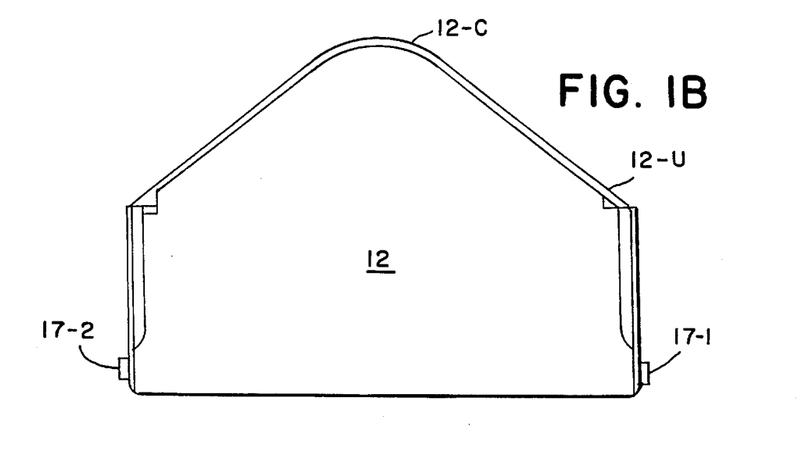
FIG. 1B is a rear view of the protective cover of FIG. 1A.
Figure 1C:
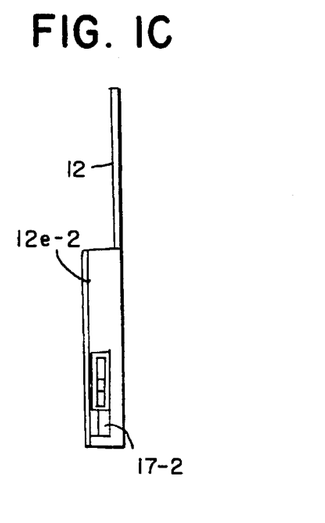
FIG. 1C is a side view of the protective cover of FIG. 1A.
Figure 1D:
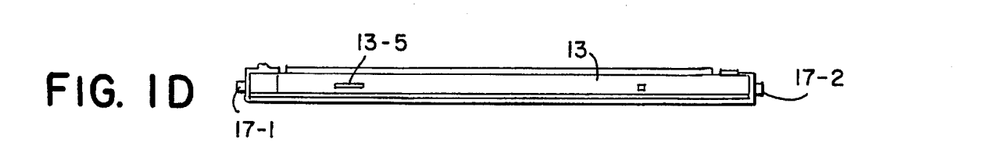
FIG. 1D is a top view of the protective cover of FIG. 1A.
Figure 1E:
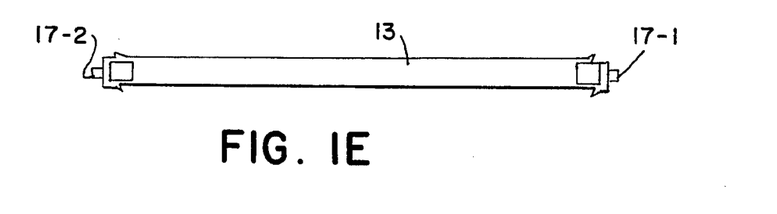
FIG. 1E is a bottom view of the protective cover of FIG. 1A.

One of the sides, for example the side 11, borders a recess 14 conforming to the object to be protected, for example a magnetic diskette (not shown). The other side 12 includes means for promoting the retention of the object. When the object is a rectangular jacket for a magnetic storage disc, the recess 14 conforms to the jacket and the retention promoting means is at least one of the lugs 15-1 and 15-2 for engaging the jacket.

The base 13 desirably includes a member 13-s for providing a shutter lock when a storage disc is inserted into the cover 10.

One of the sides, for example the side 12, faces opposite edges 12-e1 and 12-e2, with means for engaging a storage container. The engagement desirably is by cylindrical bosses 17-1 and 17-2 that project outwardly from the edges 12-e1 and 12-e2.

One of the sides, for example the side 12, includes a curved protrusion 12-c at an upper edge 12-u to facilitate handling of the associated side 12.

With respect to the manufacture of each protective cover 10, it includes a minimal projected area to enhance cost effectiveness of the molding operation. This provides a low profile front 11 as shown in FIG. 1A, which protects the shutter area of an inserted diskette, without fully covering it, in order to avoid interference with graphics on the shutter which could be damaged by scraping if the front of the cover 10 had a higher profile.

Figure 2A:
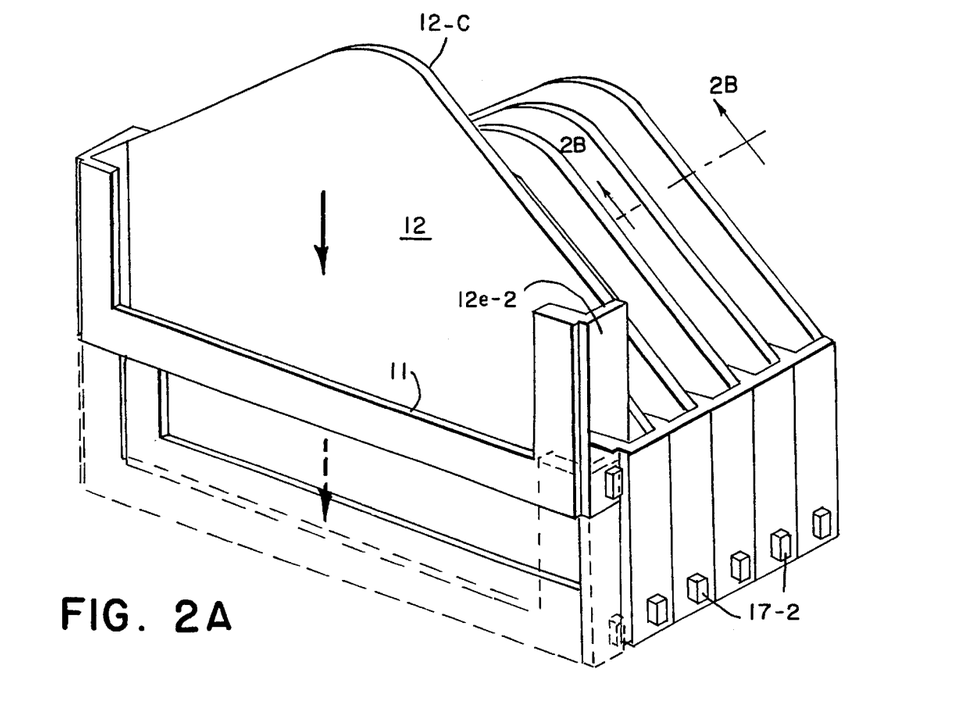
FIG. 2A is a perspective view of interlocked protective covers of the type shown in FIGS. 1A through 1E.
Figure 2B:
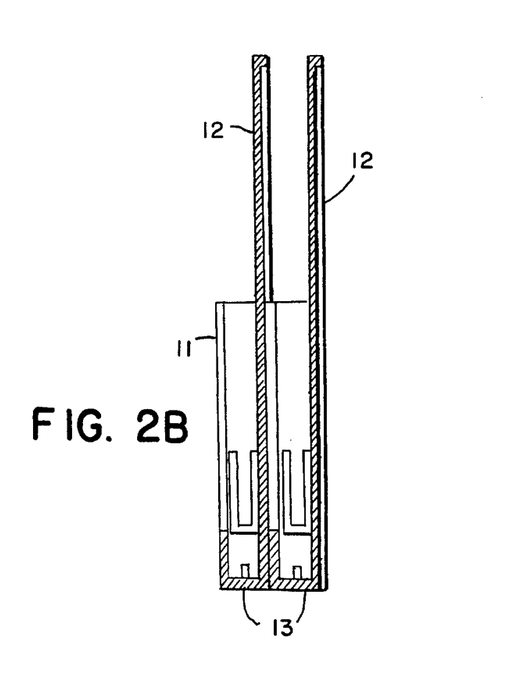
FIG. 2B is a fragmentary sectional view of the covers of FIG. 2A taken along the lines 2B—2B, with several covers of FIG. 1A shown interlocked.
Figure 2C:
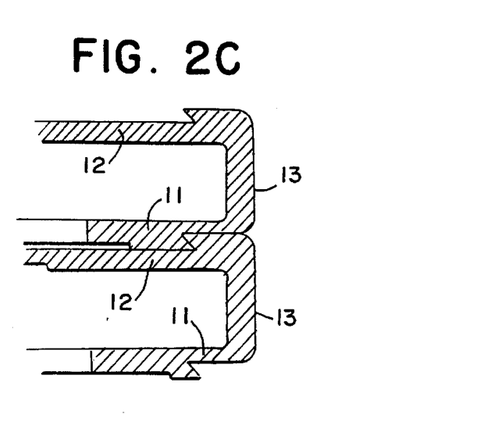
FIG. 2C is a fragmentary sectional view of the interlocked covers of FIG. 2A taken along the lines 2C—2C, with several covers of FIG. 1A shown inserted.

As shown in FIG. 2A the protective covers of the type shown in FIGS. 1A through 1E can be interlocked using the dovetail engagement as shown in FIG. 2C. Each side 11 includes a dovetail projection 11d near the edge 13, and each side 12 includes a dovetail recess 12r.

FIG. 2B is a fragmentary side view of the covers of FIG. 2A taken along the lines 2B—2B, with several covers of FIG. 1A shown interlocked.

Figure 3A:
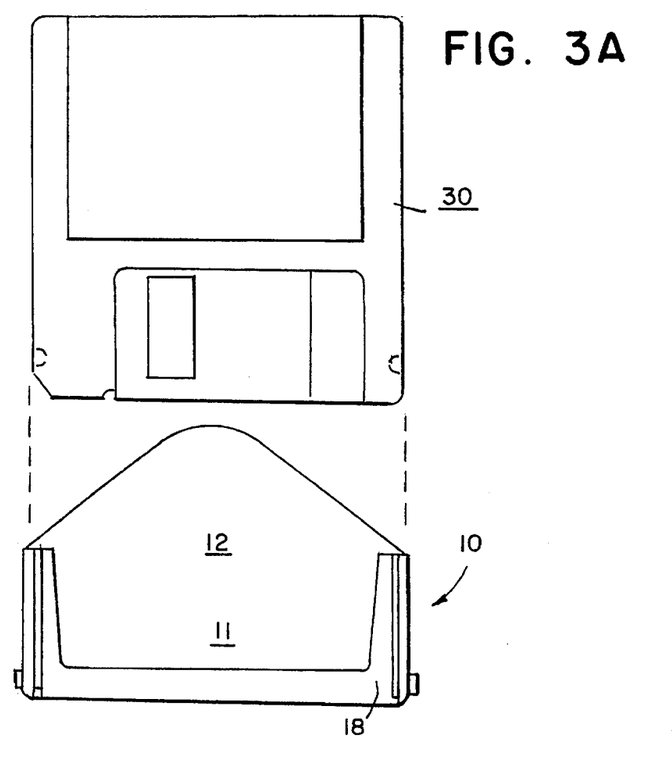
FIGS. 3A, 3B and 3C are respective views illustrating the insertion of a magnetic disc into the protective cover of FIG. 1A.
Figure 3B:
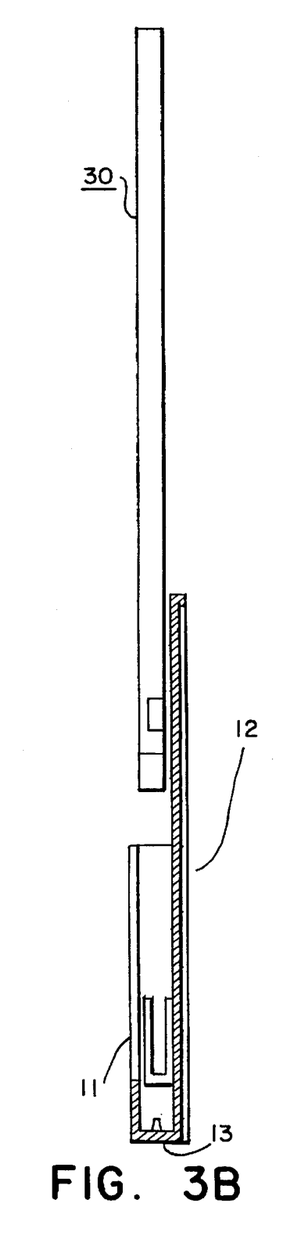
Figure 3C:
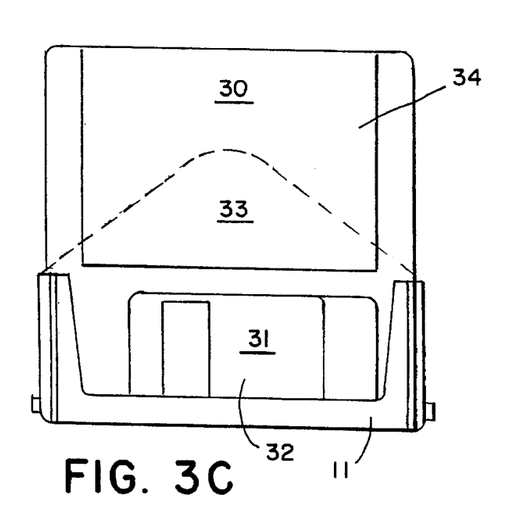

In one use, the protective cover 10 of FIG. 1A can store a magnetic disc, such as the disc 30 of FIGS. 3A, 3B and 3C. The steps of insertion are successively illustrated, beginning with the approach of the disc 30 to the cover 10 in FIG. 3A. This followed by contact of the disc 30 with the side 12 shown in FIG. 3B, culminating in the final engagement with the detent 15-1 shown in FIG. 3C.

The protective cover 10, as seen in FIGS. 3A thru 3C is proportioned to provide ready access to graphic materials accompanying diskettes for user identification, such as the indicia 31 on the shutter 32 and the indicia 33 on the housing 34. The protective covers of the prior art generally obscure such graphics making their identifications difficult and thus hindering the efficient use of data processing system in which several different diskettes are employed, requiring proper identification of the diskette before it can be suitable used in the system. In addition, it is important for the user to identify the diskette type without removing the diskette from its protective cover. Some diskettes are designed for high density (HD) storage of information and others are not, so that the user needs to know on which machine the diskette 30 can be used before removing it from its protective cover 10. In effect, the protective cover 10 of the invention provides a frame 18 for the storage of diskettes, as opposed to a completely enclosed receptacle with its objectionable obscuration of graphics and attendant difficulties in the insertion and removal of diskettes.

Another feature of the invention is that the diskettes, such as the diskette 30 of FIGS. 3A thru 3C, can be inserted bidirectionally, thus economizing on user time in the return of used diskettes to their appropriate protective covers 10.

Figure 4A:
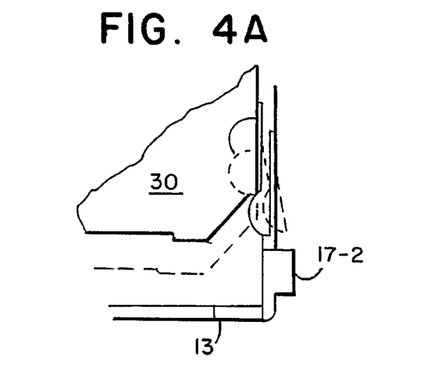
FIGS. 4A, 4B, 4C and 4D are respective views showing the engagement of the magnetic disc in FIGS. 3A–3C by the protective cover of the invention.
Figure 4B:
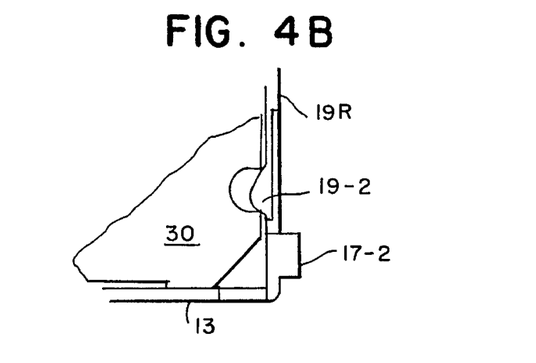
Figure 4C:
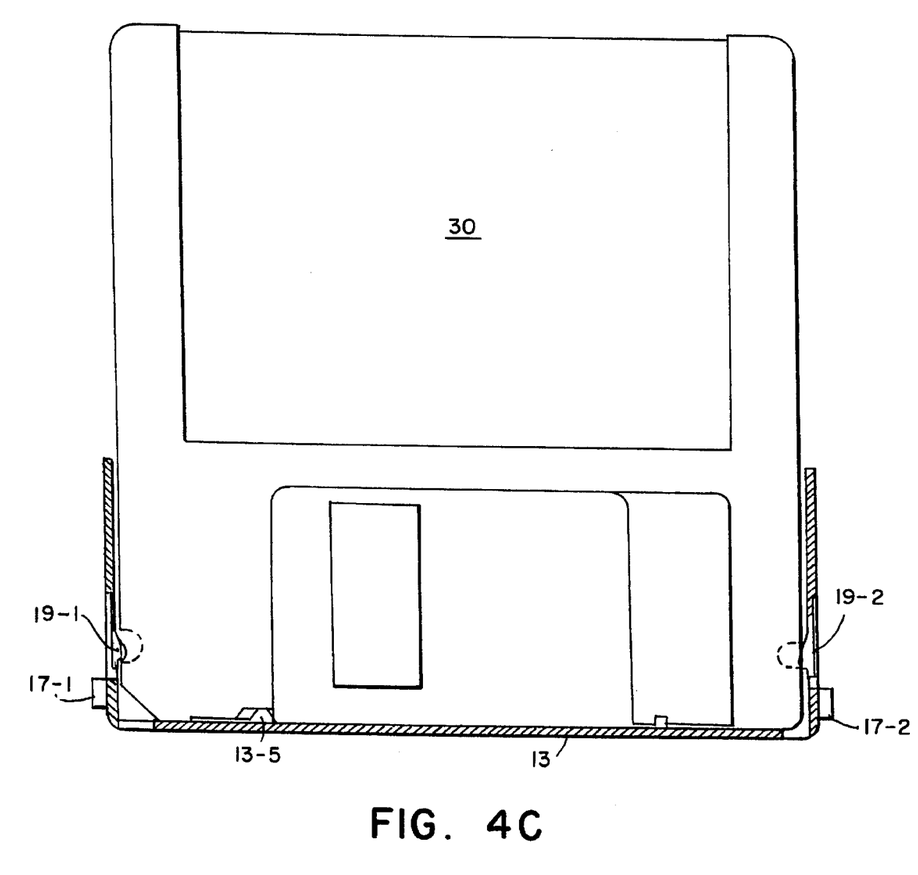
Figure 4D:
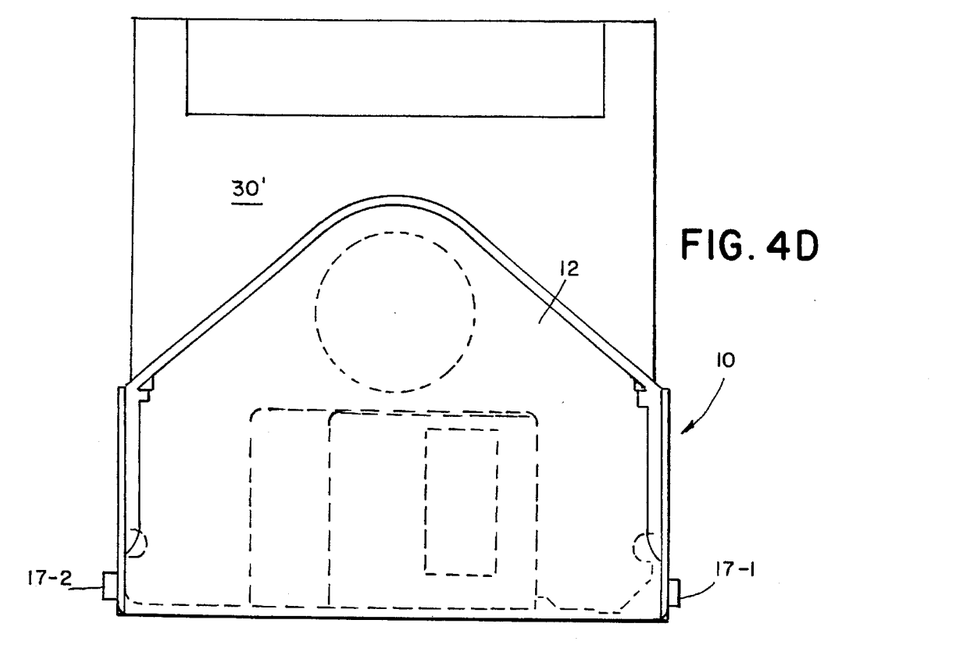

Details of the engagement are shown in FIGS. 4A, 4B, 4C and 4D. In FIG. 4A a side snap 15-2 flexes during insertion and removal of the disc 30. In FIGS. 4B and 4C the snap 15-2 is shown in a locking position. FIG. 4D is a reverse side view of FIG. 4C.

Figures 6, 9A, 9B, 9C, 9D:
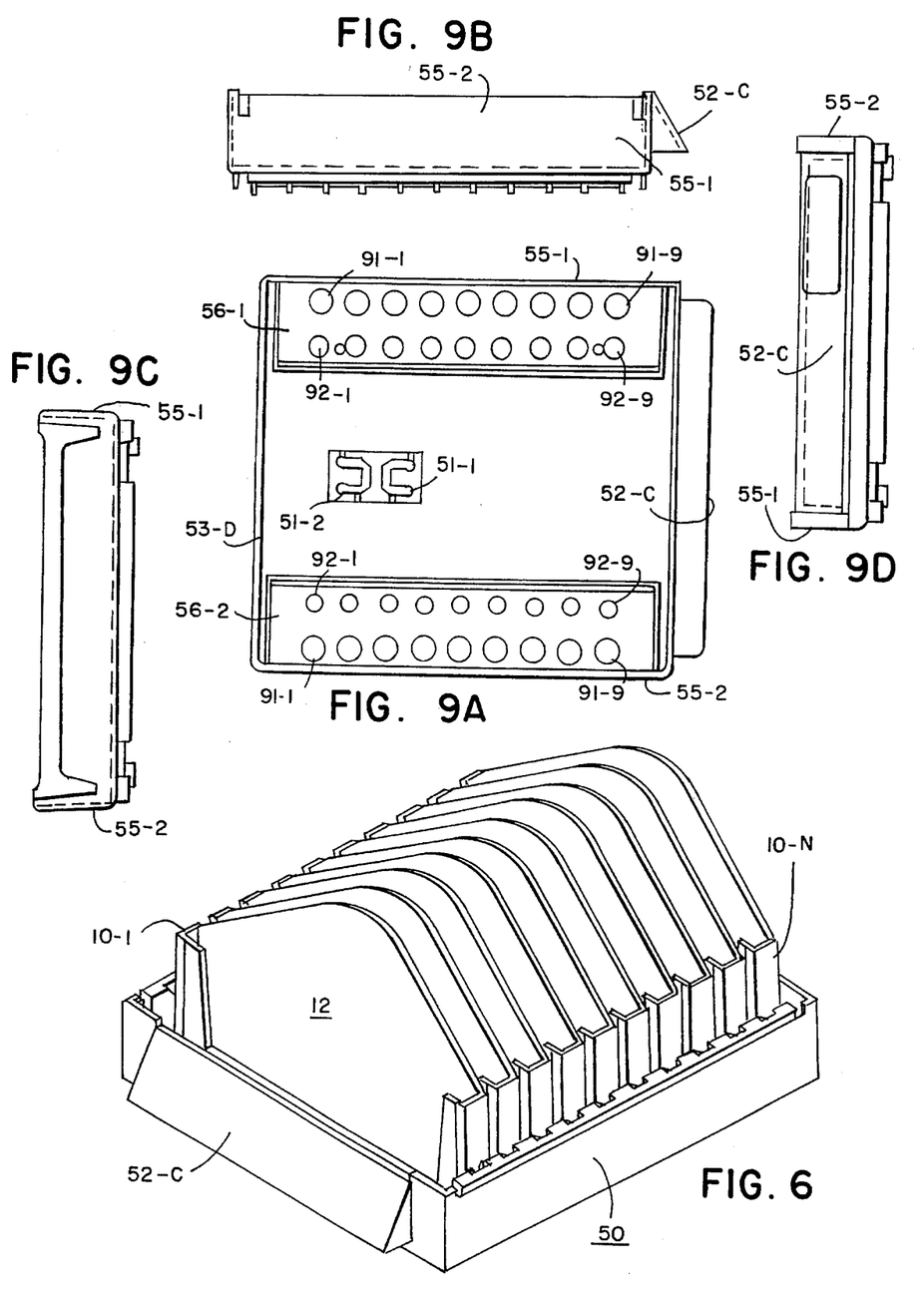
FIG. 6 is a perspective view of the tray of FIG. 5A storing protective covers in accordance with the invention.
FIGS. 9A through 9D illustrate the top of a storage tray for side members are moved into position.

A further feature of the invention illustrated in FIGS. 4A thru 4D is that a diskette 30 can be removed from its protective cover 10 while positioned in a storage tray, such as the tray 50 of FIG. 6, without touching the protective cover 10. This facility permits the user to grasp the upper portion of the stored diskette 30 and remove it by an upward pulling motion from the storage tray 50 without contacting the protective cover 10, in order to simplify the removal and reentry procedures. In addition, the diskette 30 held by a protective cover 10 in accordance with the invention is retained securely enough that it does not fall from the cover 10 when inverted; yet the holding action is sufficiently great that there is no hindrance on the removal of a diskette 30 while enclosed in a protective cover 10.

Another manufacturing feature of the invention is the use of vertically positioned stop cores which allow the production of the engagement spring fingers 19-1 and 19-2 which are under pressure in the protective cover 10 while the diskette 30 is being inserted or removed. This permits the production of flexible engagement fingers 19-1 and 19-2 which are relatively small and yet are strengthened by a reinforcement rib 19r to produce an "I" beam like structure with a sufficient moment of inertia to withstand even applications of force during insertion and removal of the diskette 30, but are not under pressure while the diskette 30 is engaged.

Figure 5A:
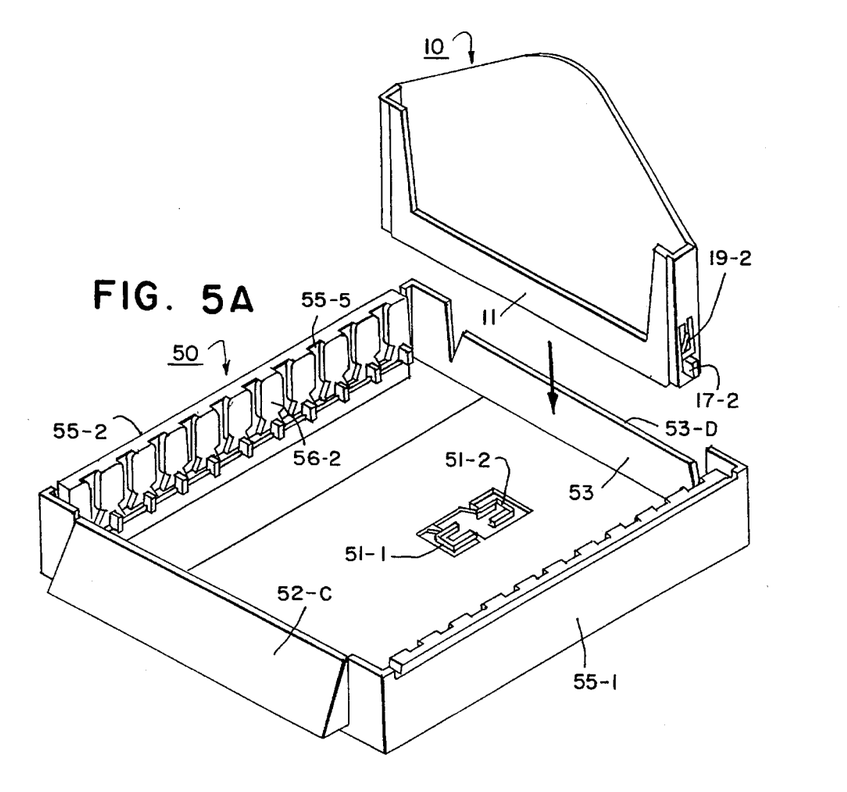
FIGS. 5A through 5C illustrated the insertion, positioning and movement of the protective cover of FIG. 1A in a storage tray in accordance with the invention.
Figure 5B:
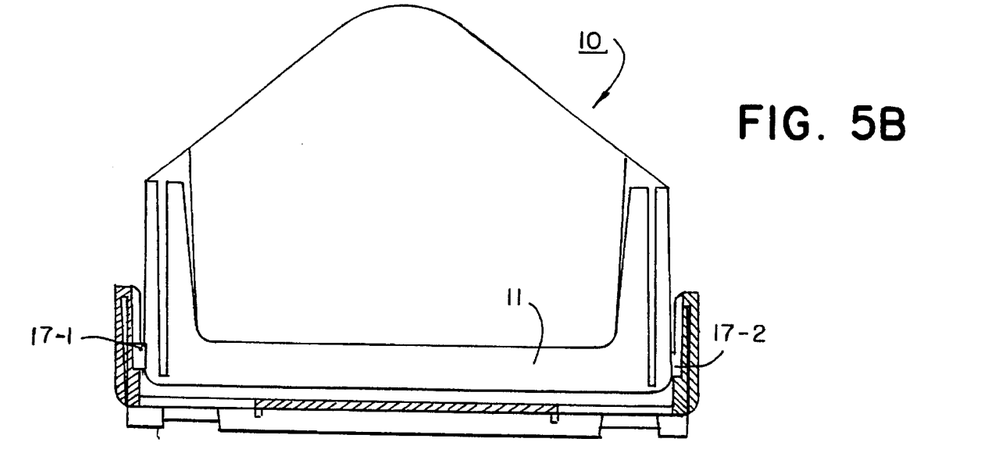
Figure 5C:
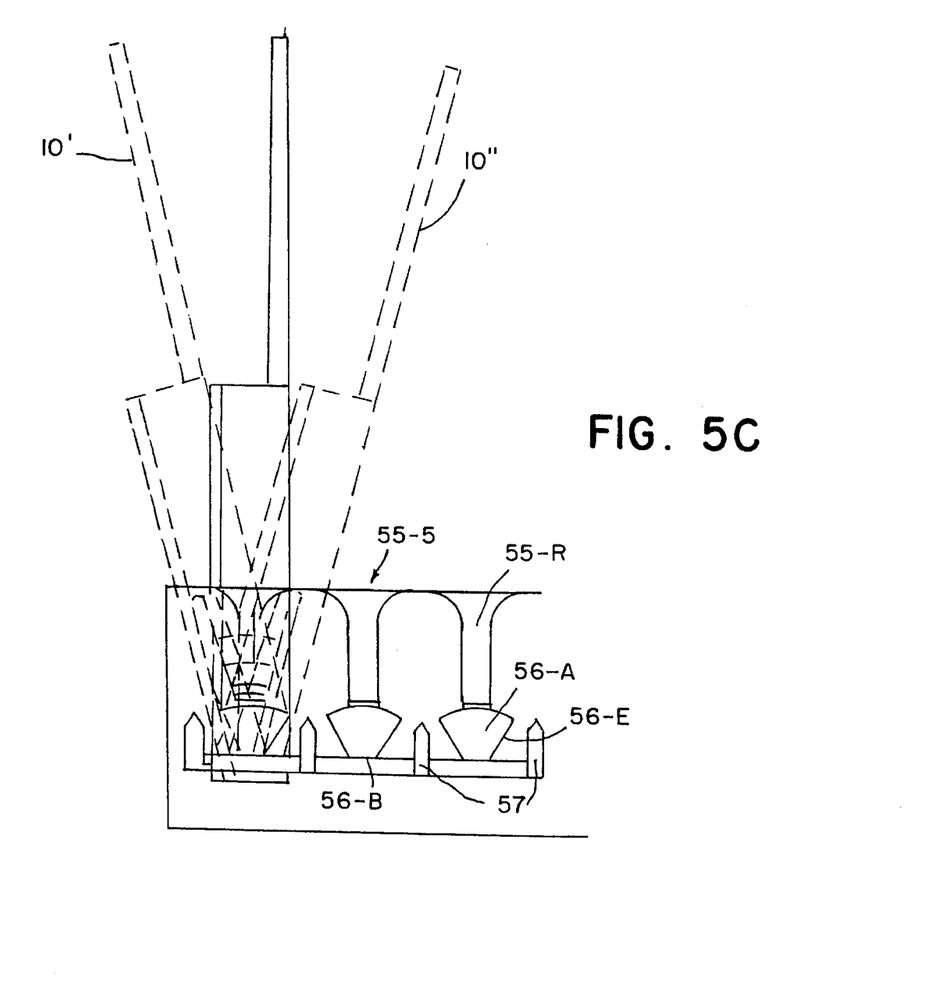

FIGS. 5A through 5C illustrate respectively the insertion, positioning and movement of the protective cover 10 of FIG. 1A in a storage tray 50 in accordance with the invention, with the tray 50 shown in perspective in FIG. 6 storing a plurality of protective covers in accordance with the invention. As indicated in FIG. 5A, the base 51 of tray 50 includes removable fasteners of clamps 51-1 and 51-2, while the front 52 includes a connector 52-c and the back wall 53 includes a ledge 53-d.

In the cross sectional view of FIG. 5B the protective cover 10 is shown seated near the base 51 and the cylindrical bosses 17-1 and 17-2 are positioned at the bottom 56-b of a slot 56-s in the side members 56-1 and 56-2 of the tray 50. The exact relationship between the side members 56-1 and 56-2 in relation to the side walls 55-1 and 55-2 is shown more particularly in FIGS. 7A through 7C.

In the fragmentary view of FIG. 5B, the protective cover 10 is shown in phantom positions 10' and 10", illustrating the rearward and forward movement of the cover 10 with respect to the rotation of cylindrical bosses, for example the boss 17-1 in the bottom 56-b of the slot 56-s. Because of the arrowhead configuration of the bottom 56-b the cover 10 can be removed from the tray 50 only when it is in its exact vertical position, as shown for the cover 10 in FIG. 5C. Generally, because of the arrowhead configuration of the bottom 56-b, the cover 10 is securely maintained in the tray 50, as illustrated for the phantom positions 10' and 10".

Still another feature of the invention is that the protective covers 10 do not contact each other when they are fanned as illustrated in FIG. 5C, i.e., stroked by the hand of the user across the tops of the diskettes in a manual search operation to identify the diskette of interest. This allows the user to rapidly identify the appropriate diskette and is made possible by the design of the inner side wall of a storage tray in accordance with the invention. This design includes specially proportioned arrowheaded recesses 56-s in the side walls 55-1 and 55-2 to limit fanning travel during flip action by a user in seeking a particular diskette of interest. Each arrowhead 56-a includes end stops 56-e to limit the travel of inserted covers during a fanning operation. Nevertheless, the invention allows dense storage of protective covers which can be retained in a storage tray, but also are easily removable to be carried portably.

With respect to the insert slots 56-s associated with the side walls 55-1 and 55-2 of the storage tray 50, entry ramps 55-r are included to provide for snap-in action in relation to the insertion and removal of stored diskettes contained within protective covers. In addition, positioning members 57 are included between the slots of the flexible walls to prevent overtravel and undertravel during fanning action and to promote a 90 degree position for removal of a particular protective cover from the storage tray.

The storage tray 50 shown in FIG. 6, into which protective covers 10-1 through 10-n are insertable, includes side walls 56-1 and 56-2 separated by the width of each protective cover 10-1 though 10-n. The side members 56-1 and 56-2 are configured for retaining each protective cover 10 between them.

Figure 7A:
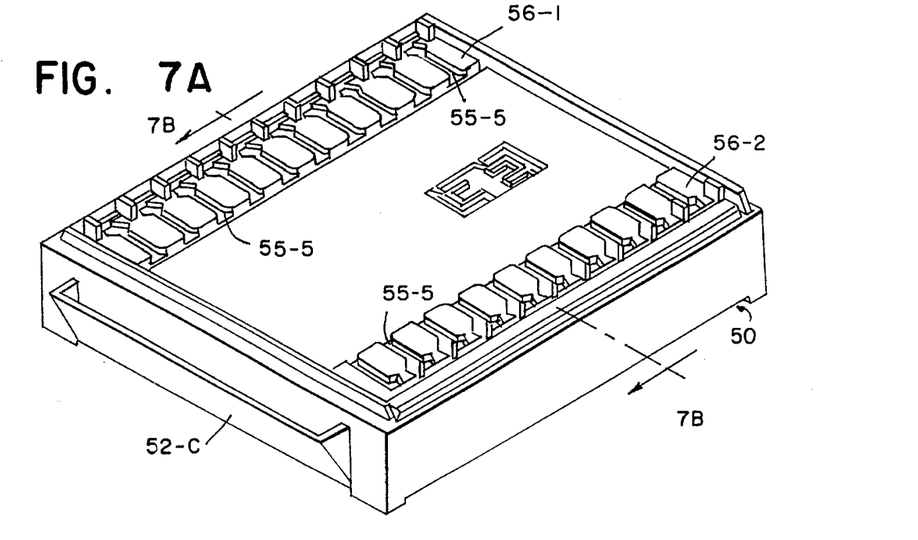
FIGS. 7A through 7C are respective bottom, sectional and top views of the storage tray of FIG. 6 without the protective covers of the invention.
Figure 7B:
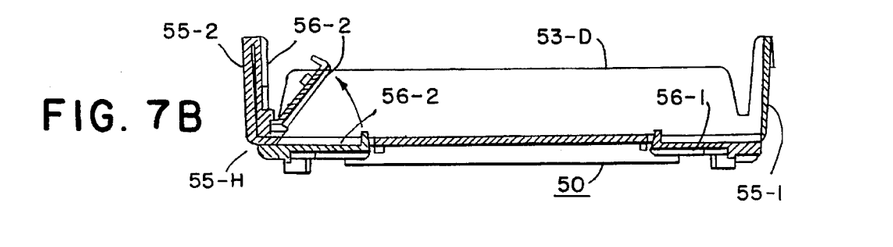
Figure 7C:
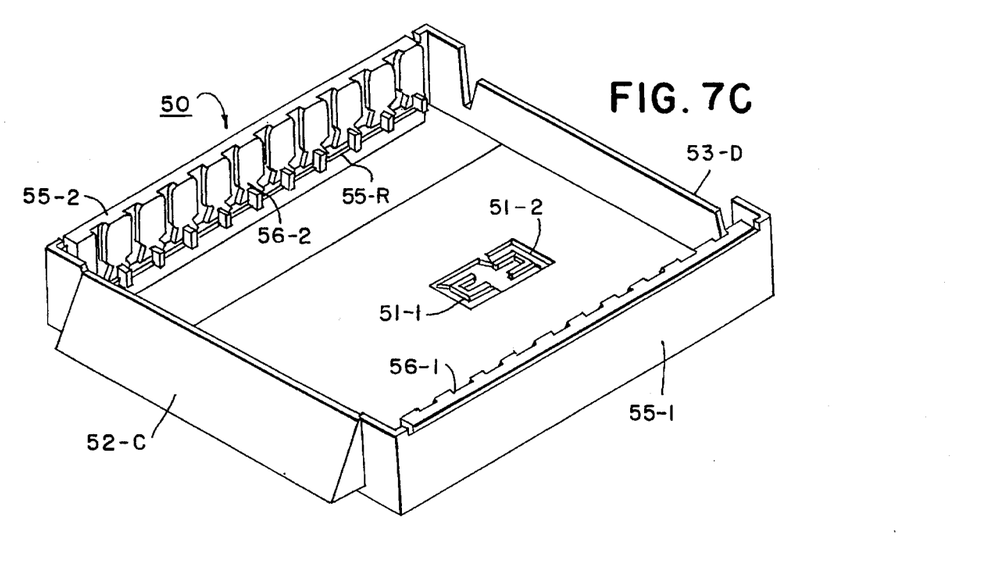

As shown in FIGS. 7A thru 7C, which are views of the storage tray 50 of FIG. 6 without the protective covers of the invention, the tray 50 includes a base 51, from which the side members 56-1 and 56-2 extend. The side members 56-1 and 56-2 include slots 56-s, which may extend at an angle with respect to the base 51, or provide a snap fit for retaining each protective cover 10. In the bottom view of FIG. 7A, the side members 56-1 and 56-2 are in alignment with the base 51, containing the removable connector 51-1 and 51-2. In FIG. 7B, one of the side members 56-1-is shown being folded against the associated side wall 55-1, while the opposite side member 56-2 is still in position aligned with the base 51 and forming a right angle with respect to its associated side wall 55-2. The result of folding both members 56-1 and 56-2 against their respective side walls 551 and 55-2 as shown in FIG. 7C.

Moreover, as shown in FIGS. 7A and 7C clips 51-1 and 5-12 are provided for connecting various storage trays together in different directions, and the side walls of the storage trays are connected by living hinges 55-h to panels 56-1 and 56-2 which can be initially aligned with the base 51 of the storage tray 50 in order to accommodate a pre-packaged set of diskettes, and then interlocked with the side walls 55-1 and 55-2 to receive individual diskettes when removed from the packaging. This facility allows the storage trays of the invention, and the prepackaged diskettes, to be offered as a unit and thus reduce the packaging. In addition, the use of a living hinge 55-h simplifies the manufacture of the storage tray 50 and avoids the need for a mold with collapsing cores, allowing the product of the invention to be produced with a simpler mold.

A further feature of the invention is that a strengthened stiffening rib 55-r is used with the storage tray 50 to keep the side walls 55-1 and 55-2 straight and strong. In addition, the manufacturing technique for producing the products of the invention makes use of relatively thin side walls to reduce material content and manufacturing cost. This technique is achieved by injection gate locations at the apexes of the individual protective covers and at the base of the storage trays.

Figures 8A, 8C:
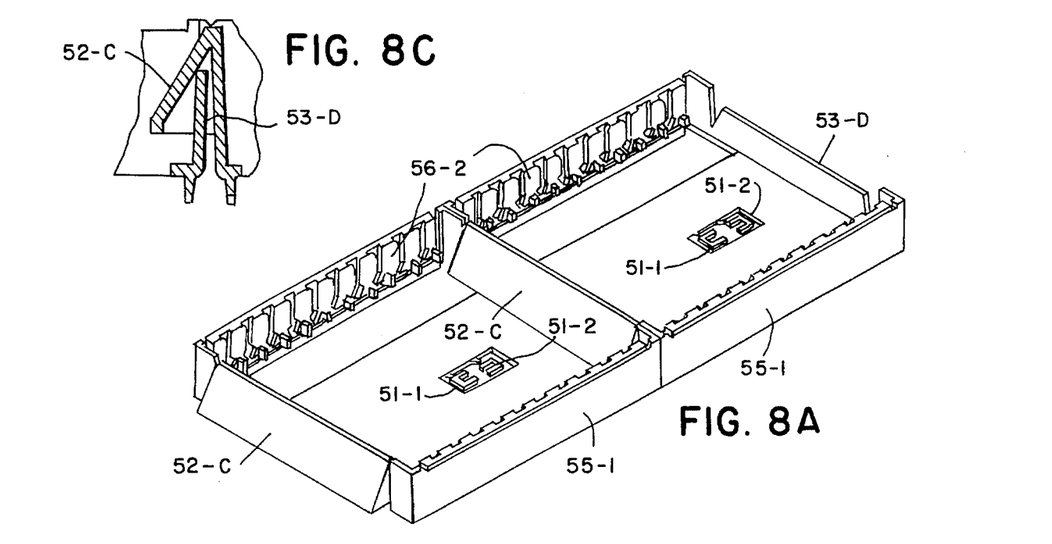

FIGS. 8A through 8D-2 illustrate the interlock of storage trays 50 and 50' in accordance with the invention. In FIG. 8A, the trays 50 and 50' are locked front to back as illustrated in the fragmentary sectional view of FIG. 8C where the connector 52-c of the tray 50 is hooked to the ledge 53-d' of the front tray 50'.

Figures 8B, 8D, 8D:
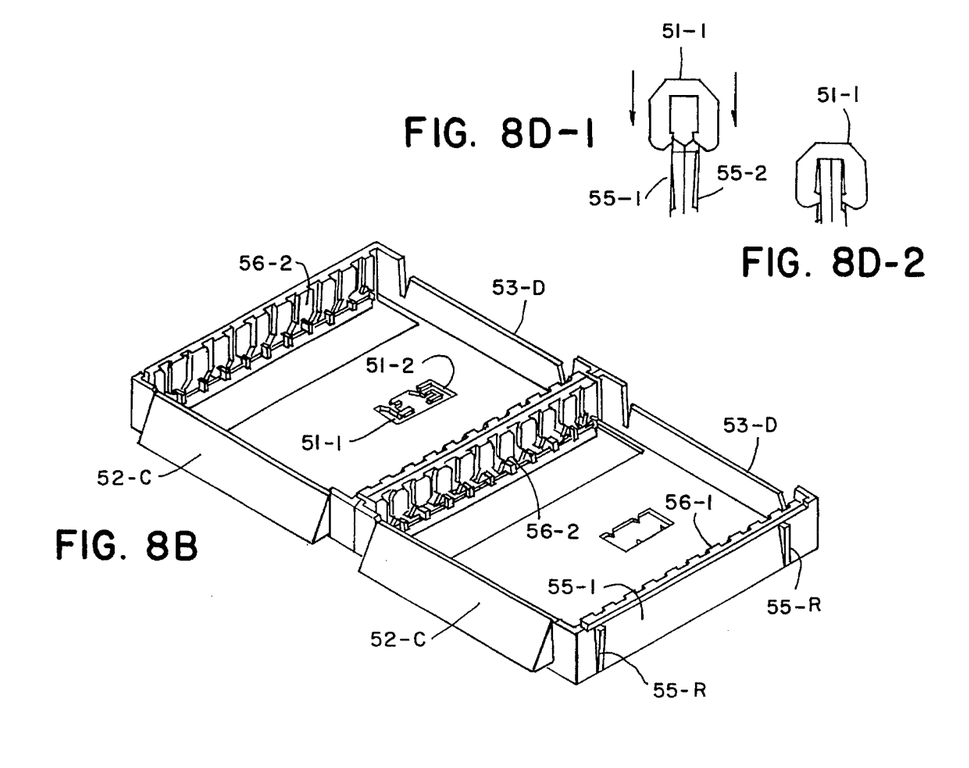

In FIG. 8B, the trays 50 and 50' are locked in a side-by-side relationship making use of clamps 51-1 and 51-2 which have been removed from the base 51 and secured to adjoining side walls 55-1 of the tray 50 and 55-2' of the tray 50'. Details showing engagement by the clamp 51-1 of the walls 55-1 and 55-2' are shown in FIGS. 8D-1 and 8D-2.

Still another manufacturing feature is the inclusion of flat-surface ribs 55-r as shown in FIG. 8B on the storage trays to compensate for draft needed to facilitate removal of parts during molding and yet provide parallel surfaces to assure proper alignment of interconnected storage trays as shown in FIGS. 8A and 8B.

In a method of protecting a object in accordance with the invention, the steps include inserting the object to be protected, for example a magnetic diskette, against the sides 11 and 12. The sides 11 and 12 are closed permanently, or temporarily, with the object therebetween.

The object can be a magnetic disc within a jacket that is inserted between side walls 12-e1 and 12-e2, and against one of the sides, for example, side 12, and is held thereagainst by a projection 19-1 or 19-2 from the side 12 that engages the jacket. The protective cover 10 containing the object is temporarily inserted into a storage tray 50.

In a method of manufacturing a protective cover 10 in accordance with the invention for an object, such as a magnetic diskette, the steps include providing front and back sides 11 and 12 of the protective cover 10, and joining the two sides 11 and 12 by a base 13 that serves to maintain the separation of the sides 11 and 12. The protective cover can be molded of a suitable resin such as polystyrene.

A top view of the storage tray 50 is shown in FIG. 9A, which is accompanied by side, front and rear views in respective FIGS. 9B, 9C and 9D.

The side members 56-1 and 56-2 of container 50 has a first set of cored areas 91-1 thru 91-9 and a second set of cored areas 92-1 thru 92-9. The purpose of the cored areas is to reduce sink marks for the major regions between the slots 55-s on the opposite surfaces of the members 56-1 and 56-2.

It will be understood that the foregoing detailed description is illustrative only and that further adaptations and embodiments of the invention will be apparent to those of ordinary skill in the art.

The protected scope of the invention is in accordance with the appended claims.

What is claimed:

1. A protective cover for diskettes in combination with a storage tray, said protective cover comprising a front side with a low-profile frame proportioned to provide ready access to graphic materials accompanying diskettes for user identification; a back side connected to said front side by a sidewall; and means within said sidewall for engaging said diskette between said front side and said back side; thereby to avoid the obscuration of graphics, including identity of diskette type, that would otherwise make identifications of diskettes difficult and hinder the efficient use of data processing systems in which a multiplicity of different diskettes are employed requiring proper identification of the diskette before it can be suitably used in a system, wherein protective covers in said storage tray do not contact each other when fanned by hand stroking across the tops of diskettes in a manual search operation to identify a diskette of interest; thereby to allow a user to rapidly identify the appropriate diskette, wherein said storage tray is proportioned to have an inner side wall including arrowhead recesses to limit fanning travel during flip action by a user seeking a particular diskette of interest, wherein said arrowhead recess includes end stops to limit the travel of inserted covers during a fanning operation, while allowing dense storage of protective covers which can be retained in said storage tray, but also are easily removable to be carried portably.

2. A protective cover for diskettes in combination with a storage tray, said protective cover comprising a front side with a low-profile frame proportioned to provide ready access to graphic materials accompanying diskettes for user identification; a back side connected to said front side by a sidewall; and means within said sidewall for engaging said diskette between said front side and said back side; thereby to avoid the obscuration of graphics, including identity of diskette type, that would otherwise make identifications of diskettes difficult and hinder the efficient use of data processing systems in which a multiplicity of different diskettes are employed requiring proper identification of the diskette before it can be suitably used in a system, wherein protective covers in said storage tray do not contact each other when fanned by hand stroking across the tops of diskettes in a manual search operation to identify a diskette of interest; thereby to allow a user to rapidly identify the appropriate diskette, wherein the side walls of said storage tray are connected by living hinges to panels which can be initially aligned with the base of a storage tray in order to accommodate a pre-packaged set of diskettes, and then interlocked with side walls to receive individual diskettes when removed from the packaging; thereby to allow the storage tray of the invention and the pre-packaged diskettes to be offered as a unit and thus reduce the packaging and the use of a living hinge simplifies the manufacture of the storage tray by avoiding the need for a mold with collapsing cores and allowing the production with a simple mold.

* * * * *